S. PICHLER.
DEVICE FOR TESTING INACCURACIES IN CAMS.
APPLICATION FILED JUNE 21, 1920.
1,390,540.
Patented Sept. 13, 1921.
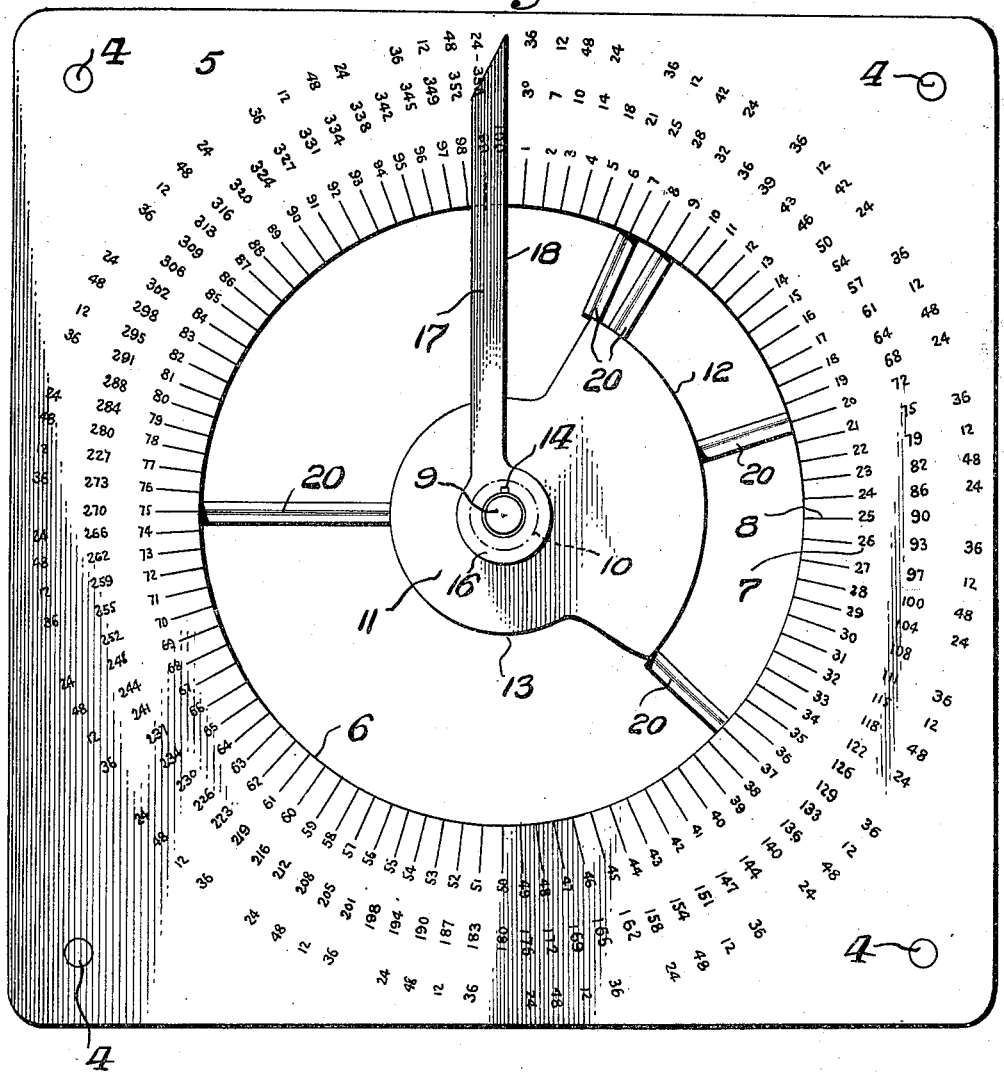
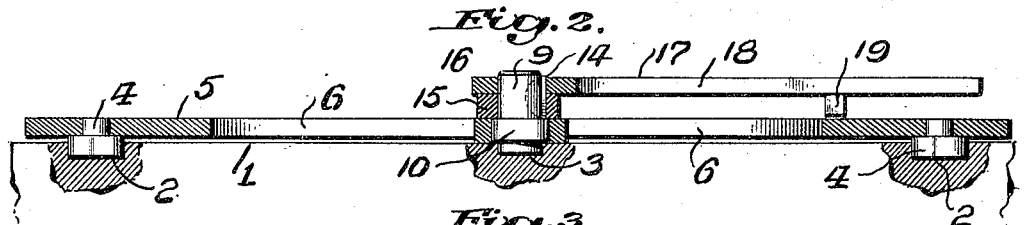
INVENTOR
STEPHEN PICHLER
BY
ATTORNEYS

UNITED STATES PATENT OFFICE.

STEPHEN PICHLER, OF DETROIT, MICHIGAN.

DEVICE FOR TESTING INACCURACIES IN CAMS.

1,390,540.  Specification of Letters Patent.  Patented Sept. 13, 1921.

Application filed June 21, 1920. Serial No. 390,557.

*To all whom it may concern:*

Be it known that I, STEPHEN PICHLER, a citizen of the United States of America, residing at Detroit, in the county of Wayne and State of Michigan, have invented certain new and useful Improvements in Devices for Testing Inaccuracies in Cams, of which the following is a specification, reference being had therein to the accompanying drawing.

This invention relates to a cam gage and has special reference to a device or instrument of precision for testing inaccuracies in cams, eccentrics and other structures having curvilinear surfaces.

The primary object of my invention is to provide a gage in which cams may be placed and accurately tested, the gage permitting of the hundredth part of an inch and the number of degrees and fractions thereof being tried out so that an artisan may expeditiously ascertain the accuracy of a cam.

Another object of this invention is to provide a cam gage embodying a graduated plate, somewhat similar to a protractor, in which a cam is placed and tested by a series of pins interposed between the cam and the plate, and positioning of the pins may be determined by a member movable relative to the plate.

A further object of my invention is to provide a cam gage as just outlined, wherein the parts are constructed with a view of reducing the cost of manufacture and at the same time retain those features by which durability and accuracy are secured.

With such ends in view my invention resides in the novel construction to be hereinafter described and then claimed, and reference will now be had to the drawing, wherein—

Figure 1 is a plan of the gage;

Fig. 2 a cross sectional view of the same, and

Fig. 3 is a detailed sectional view of a finger or movable member forming part of the gage.

In the drawing, the reference numeral 1, denotes a suitable support, as a work bench or horizontal portion of a machine, which is provided with a plurality of sockets 2 having an accurate defined relation to a socket 3. The sockets 2 are adapted to receive feet 4 of a graduated scale plate 5, said plate having a large central circular opening 6 with the walls thereof perfectly true and smooth. The upper face of the plate 5 has a series of concentrically disposed or circumferentially arranged graduations with the inner circle of graduations 7 at the outer end of marks or lines 8 radiating from the opening 6, and such graduations are consecutively numbered, for instance, from 1 to 100, representing so many tests that may be made in connection with a cam or similar structure. The consecutively arranged numbers may also represent the hundredths part of an inch in connection with the measurement of certain pieces of work.

The intermediate circle of graduations indicate degrees of a circle and the other circle of graduations indicates minutes of a degree. All of the graduations are disposed so that radial readings may be obtained, for instance, the "7" test indicating twenty-five degrees and twelve minutes. Mounted in the socket 3 of the support 1 is a post or rotary pin 9 provided with an interchangeable collar 10 which bears upon the support 1. It is over this collar that a cam 11 may be placed which is to have its surfaces 12 and 13 tested relative to the wall of the opening 6. Where the hub portion of a cam or structure is different from that shown, another collar may be substituted for the collar 10, so that the cam will have a defined relation to the rotary pin 9, and the walls of the opening 6 by reason of the feet 4 of the plate 5 having a prescribed relation to the rotary pin 9.

Keyed or otherwise mounted on the rotary pin 9, as at 14, is a spacing washer 15 and hub 16 of a finger or radial member 17, said radial member having a true radial edge 18 provided with a pointer 19, this pointer being in the form of a member riveted or otherwise connected to the finger, as best shown in Fig. 3. The pointer 19 permits of the finger being accurately placed relative to one of the radial lines or marks 8 of the plate 5, whereby an accurate reading may be obtained.

The reference numeral 20 denotes a series of test pins or members of a predetermined length, said members having true ends that may be placed in engagemenet with the wall of the opening 6 and the cam surfaces 12 and 13 of the cam 11. The pins 20 correspond in number to the tests that may be made by the gage and a series of pins is selected and interposed between the cam and the wall of the opening 6 to ascertain if the cam surfaces have been correctly formed. For instance, a test may be made at 7, 9, 20, 37 and 75 on the gage plate and to assist in correctly positioning the pins 20 the finger 17 is swung to the graduation 7 and the pin properly alined with the finger between the cam surface 12 and the wall of the opening 6. It is through the medium of the finger 17 that a pin may be properly positioned, preferably in parallelism with the radial edge 18 of the finger and if the pin does not properly fit between the cam and the plate 5, then the artisan knows that the cam surface is imperfect at 7 representing twenty-five degrees and twelve minutes as a point on the cam.

In the use of the cam gage a method is involved insomuch that the cam to be tested is placed in a plate providing an annular abutment for testing pins, then the finger shifted to indicate where the test is to be made relative to the cam and the plate, and then a pin interposed between the cam and the plate at the indicated test point. In the production of cams that are to be alike this method of testing is very important, when the rise and fall of each cam must be accurate, otherwise a predetermined and timed operation of the cams cannot be expected. With my method of testing inaccuracies it is possible to detect the least flaw and rectify the same before the cams are placed in use, and this can be expeditiously accomplished with my improved gage. Then again, the gage may be advantageously used when laying out defined curvelinear surfaces on cams or other structures, and in consequence of such use I do not care to confine my invention to the precise construction and arrangement of parts shown, other than defined by the appended claims.

What I claim is:—

1. Means for gaging a cam comprising a gage plate having an opening in which a cam to be gaged is placed, means adapted for supporting the cam in the plate opening so that said cam may be rotated therein, and a plurality of pins adapted to be interposed between the cam and the wall of the plate opening.

2. A gage for ascertaining the inaccuracies of a curvelinear surface on a piece of work, comprising a plate having an opening to receive the piece of work, means for holding the piece of work in a defined position relative to the wall of the plate opening, and a series of pins adapted to be interposed between the surface of the piece of work and the wall of the plate opening.

3. A gage as characterized in claim 2, wherein said work molding means supports a movable finger adapted to be adjusted relative to said plate to facilitate placing said pins at defined places.

4. A gage of the class described comprising a support, a graduated plate thereon having an opening, a post on said support in said opening and having a defined relation to the walls of said plate opening and adapted to position a piece of work to be gaged, a finger on said post adapted to be shifted relative to the graduations of said plate, and means adapted to be interposed between the wall of the plate opening and the piece of work to gage a surface of the piece of work at a point designated by said finger.

5. A cam gage comprising a plate having an annular wall, and a series of pins adapted to have the outer ends bear against the plate wall and the inner ends thereof contact with the surface of a cam to ascertain inaccuracies at predetermined places on the cam surface.

In testimony whereof I have hereunto affixed my signature in presence of two witnesses.

STEPHEN PICHLER.

Witnesses:
OTTO F. BARTHEL,
ANNA M. DORR.